US007913274B2

(12) United States Patent
Kendall et al.

(10) Patent No.: US 7,913,274 B2
(45) Date of Patent: Mar. 22, 2011

(54) METHOD FOR DETECTING WHETHER AN APPARATUS HAVING AN EMERGENCY ALERT FUNCTION HAS BEEN RELOCATED

(75) Inventors: Scott Allan Kendall, Westfield, IN (US); Rajeev Madhukar Sahasrabudhe, Fishers, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 617 days.

(21) Appl. No.: 10/534,965

(22) PCT Filed: Oct. 15, 2003

(86) PCT No.: PCT/US03/32943
§ 371 (c)(1),
(2), (4) Date: May 16, 2005

(87) PCT Pub. No.: WO2004/047041
PCT Pub. Date: Jun. 3, 2004

(65) Prior Publication Data
US 2006/0053464 A1    Mar. 9, 2006

Related U.S. Application Data

(60) Provisional application No. 60/426,950, filed on Nov. 15, 2002.

(51) Int. Cl.
*H04N 7/10* (2006.01)
*H04N 7/16* (2006.01)
*G06F 11/00* (2006.01)

(52) U.S. Cl. .............................. 725/33; 725/140; 714/14
(58) Field of Classification Search .................. 725/33, 725/140; 714/14
See application file for complete search history.

(56) References Cited

U.S. PATENT DOCUMENTS

| 4,718,107 | A | * | 1/1988 | Hayes ............................. 725/27 |
| 5,121,430 | A | * | 6/1992 | Ganzer et al. ................. 380/258 |
| 5,432,542 | A | * | 7/1995 | Thibadeau et al. ............. 725/35 |

(Continued)

FOREIGN PATENT DOCUMENTS
EP      0429000      5/1991
(Continued)

OTHER PUBLICATIONS
Search Report Dated Mar. 1, 2004.
(Continued)

*Primary Examiner* — James Sheleheda
(74) *Attorney, Agent, or Firm* — Robert D. Shedd; Joseph J. Opalach; Brian J. Cromarty

(57) ABSTRACT

An apparatus such as a television signal receiver includes an emergency alert function which, when activated, provides an alert output to notify users of an emergency event. According to an exemplary embodiment, the apparatus includes a tuner operative to tune signals including emergency alert signals capable of activating the emergency alert function. A processor is operative to detect a condition indicating relocation of the apparatus after a power interruption to the apparatus, and to enable a predetermined output associated with the emergency alert function responsive to detecting the condition.

9 Claims, 5 Drawing Sheets

U.S. PATENT DOCUMENTS

| | | | | |
|---|---|---|---|---|
| 5,592,173 | A | * | 1/1997 | Lau et al. .................. 342/357.12 |
| 5,867,224 | A | * | 2/1999 | Suh ............................... 348/553 |
| 6,108,365 | A | | 8/2000 | Rubin et al. |
| 6,329,904 | B1 | * | 12/2001 | Lamb ....................... 340/286.02 |
| 6,543,051 | B1 | | 4/2003 | Manson et al. |
| 7,114,169 | B1 | | 9/2006 | Kahn |
| 2002/0095673 | A1 | * | 7/2002 | Leung et al. .................... 725/25 |
| 2002/0097161 | A1 | | 7/2002 | Deeds |

FOREIGN PATENT DOCUMENTS

| | | |
|---|---|---|
| EP | 1008946 | 6/2000 |
| EP | 1143394 | 10/2002 |
| JP | 2001-339658 | 12/2001 |

OTHER PUBLICATIONS

US References Were Cited in Written Opinion, Dated Feb. 12, 2007.

* cited by examiner

METHOD FOR DETECTING WHETHER AN APPARATUS HAVING AN EMERGENCY ALERT FUNCTION HAS BEEN RELOCATED

This application claims the benefit, under 35 U.S.C. §365 of International Application PCT/US03/32943, filed Oct. 15, 2003, which was published in accordance with PCT Article 21(2) on Jun. 3, 2004 in English and which claims the benefit of U.S. provisional patent application No. 60/426,950, filed Nov. 15, 2002.

The present invention generally relates to apparatuses such as a television signal receiver having an emergency alert function, and more particularly, to techniques for detecting a condition indicating that such an apparatus has been relocated after an interruption of power to the apparatus.

Emergency events such as severe weather, natural disasters, fires, civil emergencies, war acts, toxic chemical spills, radiation leaks, or other such conditions can be devastating to unprepared individuals. With weather-related emergencies, authorities such as the National Weather Service (NWS) and the National Oceanographic and Atmospheric Administration (NOAA) are generally able to detect severe weather conditions prior to the general public. Through the use of modern weather detection devices, such as Doppler radar and weather satellites, the NWS and NOAA are able to issue early warnings of severe weather conditions which have saved many lives. However, for such warnings to be effective, they must be communicated to their intended recipients.

Certain apparatuses are capable of receiving emergency alert signals provided by sources such as the NWS and NAA, and provide an emergency alert function using Specific Area Message Encoding (SAME) technology. Apparatuses using SAME technology typically require a user to perform a setup process for the emergency alert function by selecting items such as one or more geographical areas of interest, and one or more types of emergency events which activate the emergency alert function. Once the setup process is complete, the emergency alert function may be activated when incoming emergency alert signals including SAME data indicate the occurrence of an emergency event which corresponds to the geographical area(s) and types of emergency event selected by the user during the setup process. When the emergency alert function is activated, an alert output such as an audio message may be provided to alert individuals of the emergency event.

With apparatuses using technology such as SAME technology, problems may occur as the result of a power interruption. A power interruption to the apparatus may for example be the result of a temporary condition, such as a thunderstorm or interference to the power distribution system. Alternatively, a power interruption to the apparatus may be the result of the apparatus being physically relocated to a new geographical area, such as during a household move. In the event that the apparatus has been relocated to a new geographical area, it may be important that certain user setup information for the emergency alert function, such as geographical area information, be updated in order to ensure that the apparatus properly detects emergency events in the new geographical area. Without such updated information for the emergency alert function, the apparatus may not detect important emergency events in the new geographical area, and thereby expose users to dangerous conditions.

Accordingly, there is a need for an apparatus having an emergency alert function which avoids the foregoing problems, and thereby detects a condition indicating that such an apparatus has been relocated after a power interruption to the apparatus. The present invention addresses these and other issues.

In accordance with an aspect of the present invention, a method for controlling an apparatus having an emergency alert function is disclosed. According to an exemplary embodiment, the method comprises steps of detecting a condition indicating relocation of the apparatus after a power interruption to the apparatus, and enabling a predetermined output associated with the emergency alert function responsive to detecting the condition.

In accordance with another aspect of the present invention, an apparatus having an emergency alert function is disclosed. According to an exemplary embodiment, the apparatus comprises tuning means for tuning signals including emergency alert signals capable of activating the emergency alert function. The apparatus further comprises processing means for detecting a condition indicating relocation of the apparatus after a power interruption to the apparatus, and for enabling a predetermined output associated with the emergency alert function responsive to detecting the condition.

In accordance with yet another aspect of the present invention, a television signal receiver having an emergency alert function is disclosed. According to an exemplary embodiment, the television signal receiver comprises a tuner operative to tune signals including emergency alert signals capable of activating the emergency alert function. The television signal receiver further comprises a processor operative to detect a condition indicating relocation of the television signal receiver after a power interruption to the television signal receiver, and to enable a predetermined output associated with the emergency alert function responsive to detecting the condition.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
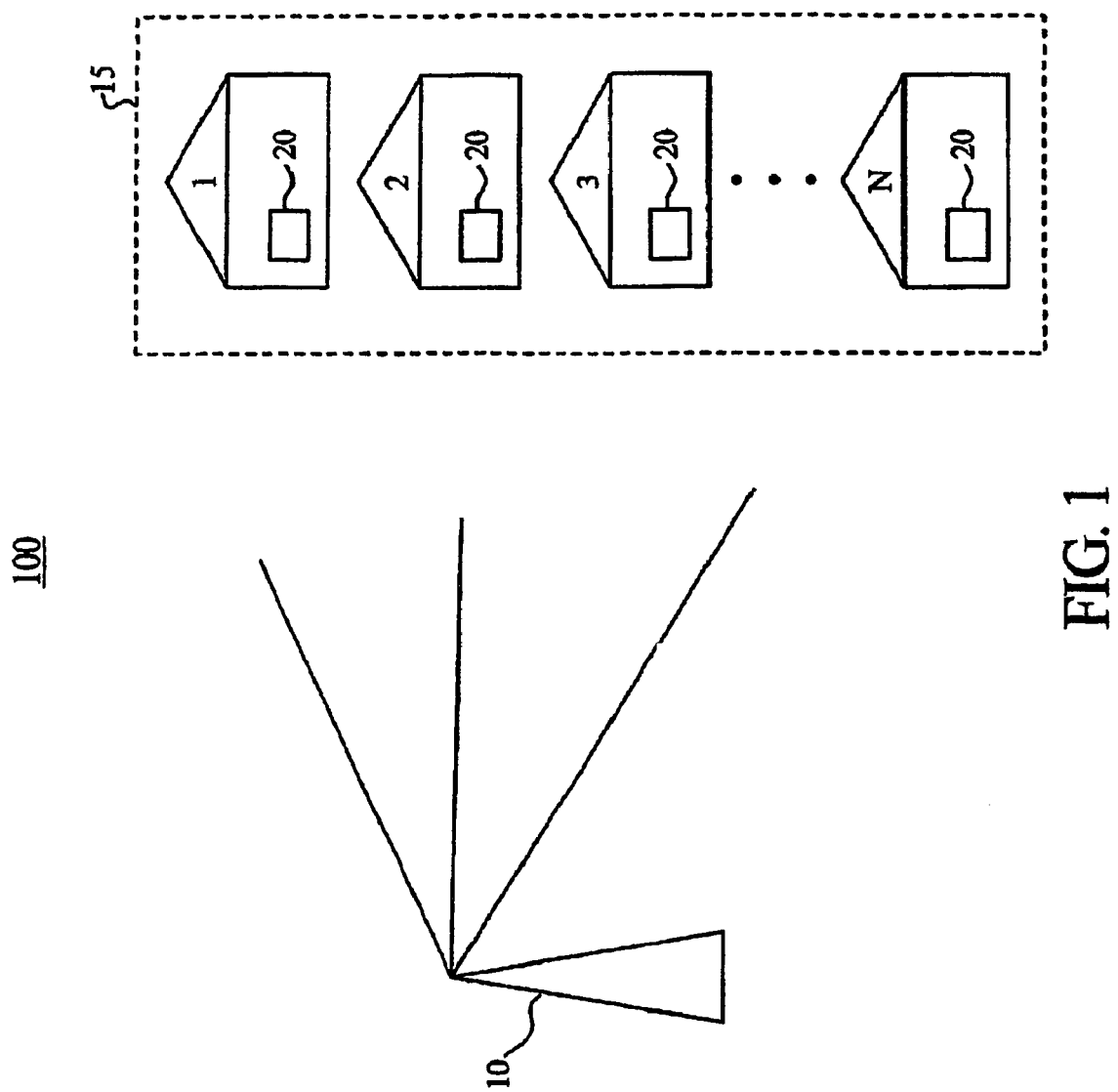
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises signal transmission means such as signal transmission source 10, dwelling means such as dwelling units 15 (i.e., 1, 2, 3 . . . N, where N may be any positive integer), and signal receiving means such as television signal receivers 20.

In FIG. 1, dwelling units 15 may represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal receiver 20 having an emergency alert function. According to the present invention, the emergency alert function enables television signal receiver 20 to receive emergency alert signals and provide one or more alert outputs to notify individuals of an emergency event. As will be discussed later herein, television signal receiver 20 is also capable of, among other things, detecting a condition indicating that television signal receiver 20 has been relocated after a power interruption, and enabling a user to provide updated information associated with the emergency alert function when the condition is detected. This ensures that the emergency alert function of television signal receiver 20 will continue to detect designated emergency events when television signal receiver 20 is relocated to a new geographical area. For purposes of example, the present invention will be described herein with reference to television signal receiver 20. However, the principles of the present invention may also be used by other apparatuses, such as radios.

According to an exemplary embodiment, signal transmission source 10 transmits signals including emergency alert signals which may be received by each television signal receiver 20. The emergency alert signals may be provided from an authority such as the NWS, or other authorities such as governmental entities or the like. In response to the emergency alert signals, each television signal receiver 20 may provide one or more alert outputs to thereby notify individuals of the emergency event. Signal transmission source 10 may transmit such emergency alert signals to television signal receivers 20 via any wired or wireless link such as, but not limited to, terrestrial, cable, satellite, fiber optic, digital subscriber line (DSL), and/or any other type of broadcast and/or multicast means.

Figure 2:
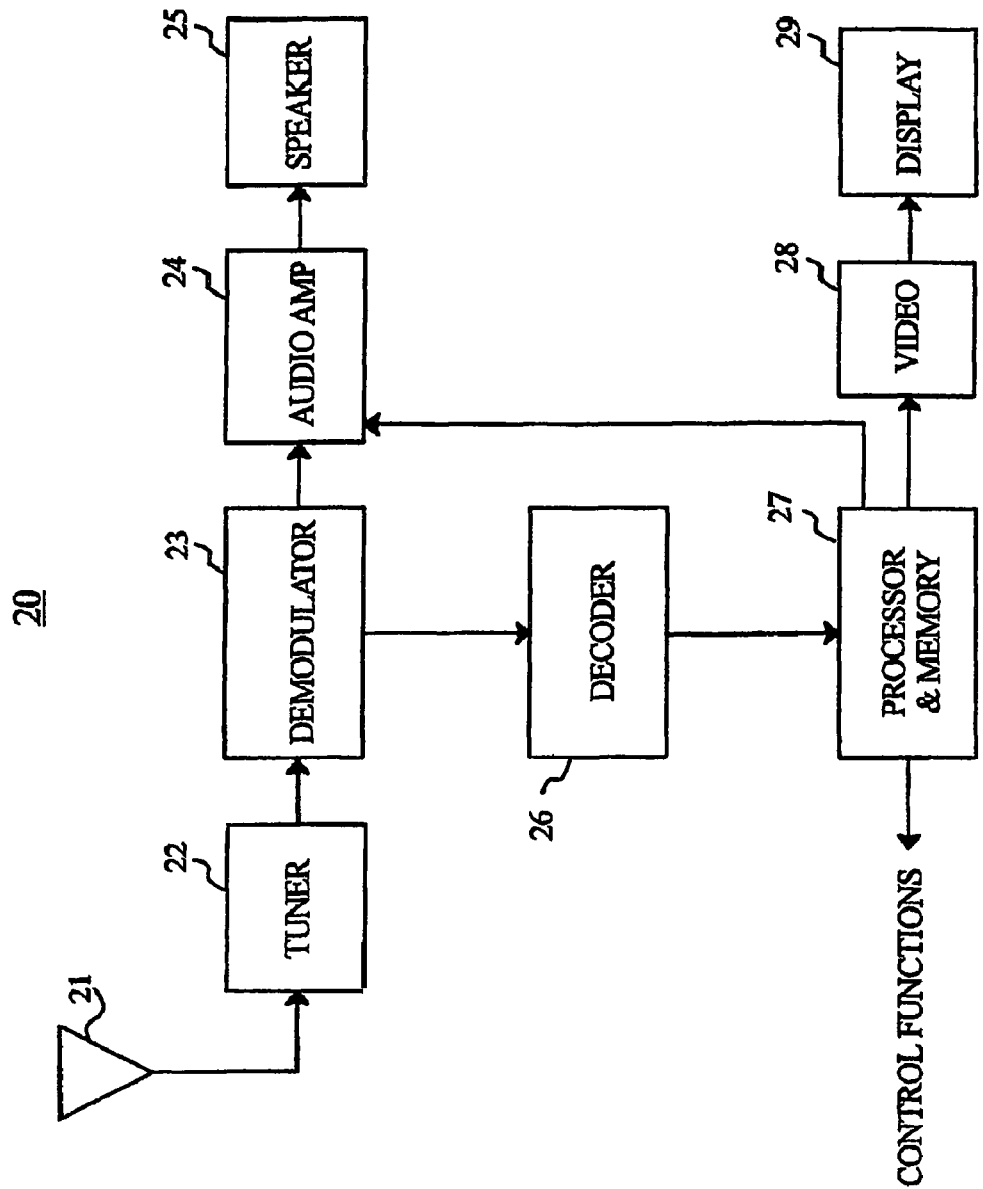
FIG. 2 is a block diagram of a television signal receiver according to an exemplary embodiment of the present invention.

Referring to FIG. 2, a block diagram of an exemplary embodiment of television signal receiver 20 of FIG. 1 is shown. In FIG. 2, television signal receiver 20 comprises signal receiving means such as signal receiving element 21, tuning means such as tuner 22, demodulation means such as demodulator 23, audio amplification means such as audio amplifier 24, audio output means such as speaker 25, decoding means such as decoder 26, processing means and memory means such as processor and memory 27, video processing means such as video processor 28, and visual output means such as display 29. Some of the foregoing elements may for example be embodied using integrated circuits (ICs). For clarity of description, certain conventional elements of television signal receiver 20 including control signals may not be shown in FIG. 2.

Signal receiving element 21 is operative to receive signals including audio and/or video signals from signal sources, such as signal transmission source 10 in FIG. 1. According to an exemplary embodiment, received audio signals may include digitally encoded emergency alert signals. Signal receiving element 21 may be embodied as any signal receiving element such as an antenna, input terminal or other element.

Tuner 22 is operative to tune signals including audio and/or video signals. According to an exemplary embodiment, tuner 22 is capable of tuning audio signals on at least the following designated NWS frequencies: 162.400 MHz, 162.425 MHz, 162.450 MHz, 162.475 MHz, 162.500 MHz, 162.525 MHz and 162.550 MHz. Other frequencies may also be tuned. As previously indicated herein, such audio signals may include digitally encoded emergency alert signals.

Demodulator 23 is operative to demodulate signals provided from tuner 22. According to an exemplary embodiment, demodulator 23 demodulates audio signals to thereby generate demodulated audio signals representing audio content such as an NWS audio message, a warning alert tone and/or other audio content. Audio amplifier 24 is operative to amplify the audio signals output from demodulator 23 responsive to a control signal provided from processor 27. Speaker 25 is operative to aurally output the amplified audio signals provided from audio amplifier 24.

Decoder 26 is operative to decode signals including audio and/or video signals. According to an exemplary embodiment, decoder 26 decodes audio signals provided from demodulator 23 to thereby extract digitally encoded frequency shift keyed (FSK) signals, which represent emergency alert signals indicating an emergency event. According to this exemplary embodiment, the emergency alert signals include data comprising SAME data associated with the emergency event. SAME data comprises a digital code representing information such as the specific geographical area affected by the emergency event, the type of emergency event (e.g., tornado watch, radiological hazard warning, civil emergency, etc.), and the expiration time of the event alert. SAME data is used by the NWS and other authorities to improve the specificity of emergency alerts and to decrease the frequency of false alerts. Other data and information may also be included in the emergency alert signals according to the present invention. According to an exemplary embodiment, decoder 26 is also operative to decode data, such as data indicating the current time and/or other data, included in the vertical blanking interval (VBI) of an incoming television signal.

Processor and memory 27 are operative to perform various processing and data storage functions of television signal receiver 20. According to an exemplary embodiment, processor 27 receives the emergency alert signals from decoder 26 and determines whether the emergency alert function of television signal receiver 20 is activated based on data included in the emergency alert signals. According to this exemplary embodiment, processor 27 compares data in the emergency alert signals to user setup data stored in memory 27 to determine whether the emergency alert function is activated. As will be described later herein, a setup process for the emergency alert function of television signal receiver 20 allows a user to select items such as an applicable geographical area(s), and type(s) of emergency events (e.g., tornado watch, radiological hazard warning, civil emergency, etc.) which activate the emergency alert function.

When the emergency alert function of television signal receiver 20 is activated, processor 27 outputs one or more control signals which enable various operations. According to an exemplary embodiment, such control signals enable one or more alert outputs (e.g., aural and/or visual) to thereby notify individuals of the emergency event. Such control signals may also enable other operations of television signal receiver 20, such as causing it to be switched from an off/standby mode to an on mode.

Processor 27 is also operative to detect a condition indicating that television signal receiver 20 has been relocated after a power interruption, and enable a user to provide updated information associated with the emergency alert function when the condition is detected. This ensures that the emergency alert function of television signal receiver 20 will continue to detect designated emergency events when television signal receiver 20 is relocated to a new geographical area. According to an exemplary embodiment, the condition indicating that television signal receiver 20 has been relocated may include one or more factors, such as the duration of the power interruption and/or the signal strength on a previously identified frequency channel associated with the emergency alert function. Further details regarding these aspects of the present invention will be provided later herein.

Video processor 28 is operative to process signals including video signals. According to an exemplary embodiment, such video signals may include embedded messages such as NWS text messages and/or other messages that provide details regarding emergency events. Video processor 28 may include closed caption circuitry which enables closed caption displays. Display 29 is operative to provide visual displays corresponding to processed signals provided from video processor 28. According to an exemplary embodiment, display 29 may provide visual displays including the aforementioned messages that provide details regarding emergency events.

Figure 3:
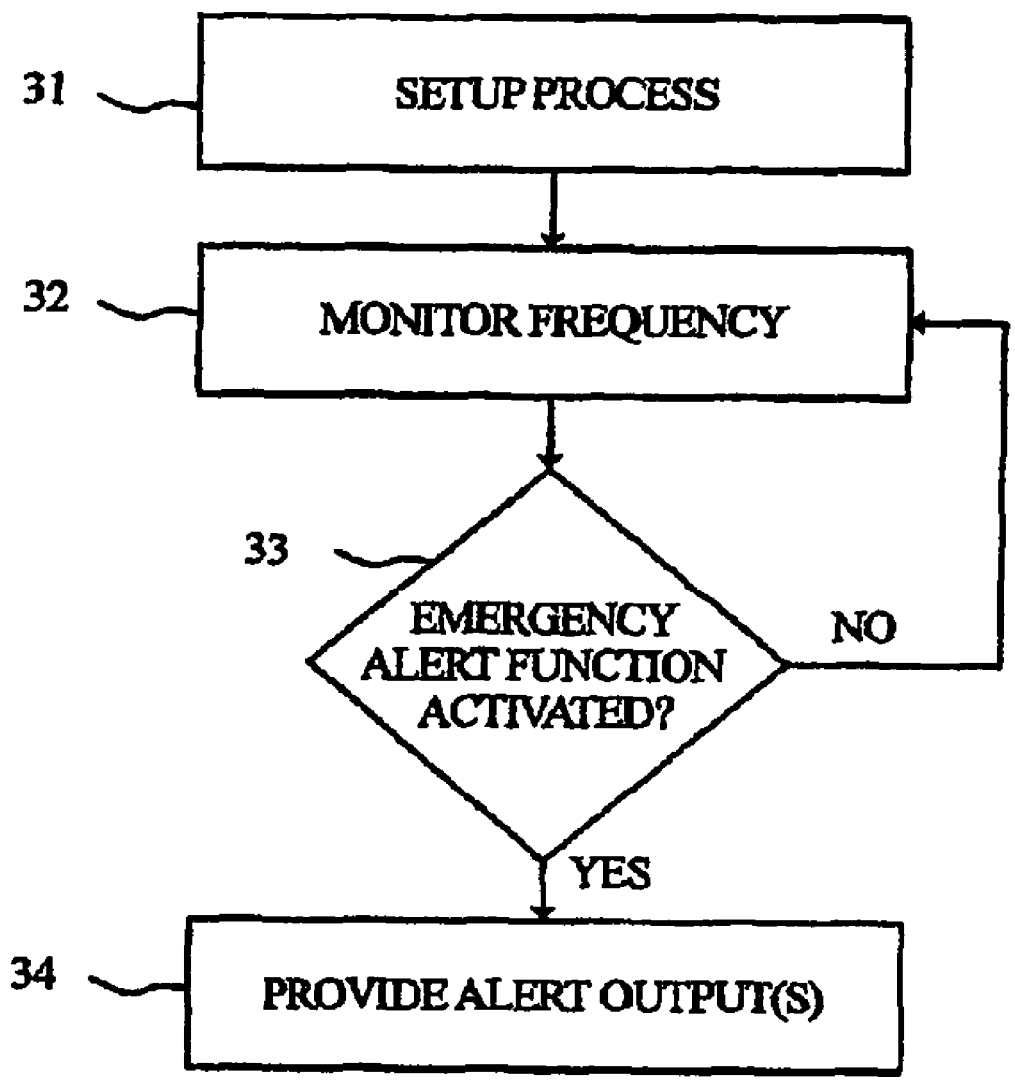
FIG. 3 is a flowchart illustrating exemplary steps according to one aspect of the present invention.

Turning now to FIG. 3, a flowchart 30 illustrating exemplary steps according to the present invention is shown. For purposes of example and explanation, the steps of FIG. 3 will be described with reference to television signal receiver 20 of FIG. 2. The steps of FIG. 3 are merely exemplary, and are not intended to limit the present invention in any manner.

At step 31, a setup process for the emergency alert function of television signal receiver 20 is performed. According to an exemplary embodiment, a user performs this setup process by providing inputs to television signal receiver 20 (e.g., using a remote control device not shown) responsive to an on-screen menu displayed via display 29. Such an on-screen menu may for example be part of an electronic program guide (EPG) function of television signal receiver 20. According to an exemplary embodiment, the user may select at least the following items during the setup process at step 31:

A. Enable/Disable—The user may select whether to enable or disable the emergency alert function.

B. Frequency Selection—The user may select the monitoring frequency to tune to in order to receive emergency alert signals. For example, the user may select a frequency such as one of the following NWS transmission frequencies: 162.400 MHz, 162.425 MHz, 162.450 MHz, 162.475 MHz, 162.500 MHz, 162.525 MHz and 162.550 MHz. The selection of a monitoring frequency may for example be facilitated through a frequency scanning operation which scans various frequency channels to thereby identify the monitoring frequencies that provide the highest signal strength.

C. Geographical Areas—The user may select one or more geographical areas of interest. For example, the user may select a particular continent, country, region, state, area code, zip code, city, county, municipality, subdivision, and/or other definable geographical area. According to an exemplary embodiment, such geographical area(s) may be represented in memory 27 by location data, such as one or more Federal Information Processing Standard (FIPS) location codes.

D. Event Types—The user may select one or more types of emergency events which activate the emergency alert function. For example, the user may designate that events such as civil emergencies, radiological hazard warnings, and/or tornado warnings activate the emergency alert function, but that events such as a thunderstorm watch does not, etc. The user may also select whether the conventional warning audio tone provided by the NWS and/or other alert mechanism activates the emergency alert function. According to the present invention, different severity or alert levels (e.g., statement, watch, warning, etc.) may represent different "events." For example, a thunderstorm watch may be considered a different event from a thunderstorm warning.

E. Alert Outputs—The user may select one or more alert outputs to be provided when the emergency alert function is activated. According to an exemplary embodiment, the user may select visual and/or aural outputs to be provided for each type of emergency event that activates the emergency alert function. For example, the user may select to display a visual message (e.g., an NWS text message as a closed caption display) and/or tune television signal receiver 20 to a specific channel. The user may also for example select to aurally output a warning tone (e.g., chime, siren, etc.) and/or an audio message (e.g., NWS audio message), and the desired volume of each. Moreover, the alert outputs may be selected on an event-by-event basis. Other types of alert outputs may also be provided according to the present invention.

According to the present invention, other menu selections may also be provided at step 31 and/or some of the menu selections described above may be omitted. Data corresponding to the user's selections during the setup process of step 31 is stored in memory 27.

At step 32, television signal receiver 20 monitors the frequency selected by the user during the setup process of step 31 (i.e., item B) for emergency alert signals. According to an exemplary embodiment, tuner 22 monitors the selected frequency and thereby receives incoming emergency alert signals. According to the present invention, television signal receiver 20 is capable of monitoring a frequency and receiving emergency alert signals during all modes of operation, including for example when television signal receiver 20 is turned on, turned off, and/or during playback of recorded audio and/or video content.

At step 33, a determination is made as to whether the emergency alert function of television signal receiver 20 is activated. According to an exemplary embodiment, processor 27 makes this determination by comparing data included in the incoming emergency alert signals to data stored in memory 27. As previously indicated herein, the emergency alert signals may include data such as SAME data which represents information including the type of emergency event (e.g., tornado watch, radiological hazard warning, civil emergency, etc.) and the specific geographical area(s) affected by the emergency event. According to an exemplary embodiment, processor 27 compares this SAME data to corresponding user setup data (i.e., items C and D of step 31) stored in memory 27 to thereby determine whether the emergency alert function is activated. In this manner, the emergency alert function of television signal receiver 20 is activated when the emergency event indicated by the emergency alert signals corresponds to: (1) the geographical area(s) selected by the user for item C of step 31 and (2) the event type(s) selected by the user for item D of step 31.

If the determination at step 33 is negative, process flow loops back to step 32 where tuner 22 continues to monitor the selected frequency. Alternatively, if the determination at step 33 is positive, process flow advances to step 34 where television signal receiver 20 provides one or more alert outputs to thereby notify individuals of the emergency event.

According to an exemplary embodiment, processor 27 enables the one or more alert outputs at step 34 in accordance with the user's selections during the setup process of step 31 (i.e., item E), and such alert outputs may be aural and/or visual in nature. For example, aural outputs such as a warning tone and/or an NWS audio message may be provided at step 34 via speaker 25, and the volume of such aural outputs may be controlled in accordance with the volume level set by the user during the setup process of step 31. Visual outputs may also be provided at step 34 via display 29 to notify individuals of the emergency event. According to an exemplary embodiment, an auxiliary information display such as an NWS text message (e.g., as a closed caption display) and/or a video output from a specific channel may be provided at step 34 via display 29 under the control of processor 27.

According to another exemplary embodiment, the alert output(s) provided at step 34 may be based on the severity or alert level of the particular emergency event. For example, emergency events may be classified in one of three different alert level categories, such as statement, watch, and warning. With such a classification scheme, the alert output for an emergency event at a level 1 or statement level may be provided by an unobtrusive notification means such as a blinking light emitting diode (LED) since it is the least severe type of emergency event. The alert output for an emergency event at a level 2 or watch level may have some type of audio component (e.g., radio message). The alert output for an emergency event at a level 3 or warning level may be provided by a siren or other type of alarm since it is the most severe type of emergency event. Other types of aural and/or visual alert outputs than those expressly described herein may also be provided at step.34 according to the present invention.

Figure 4:
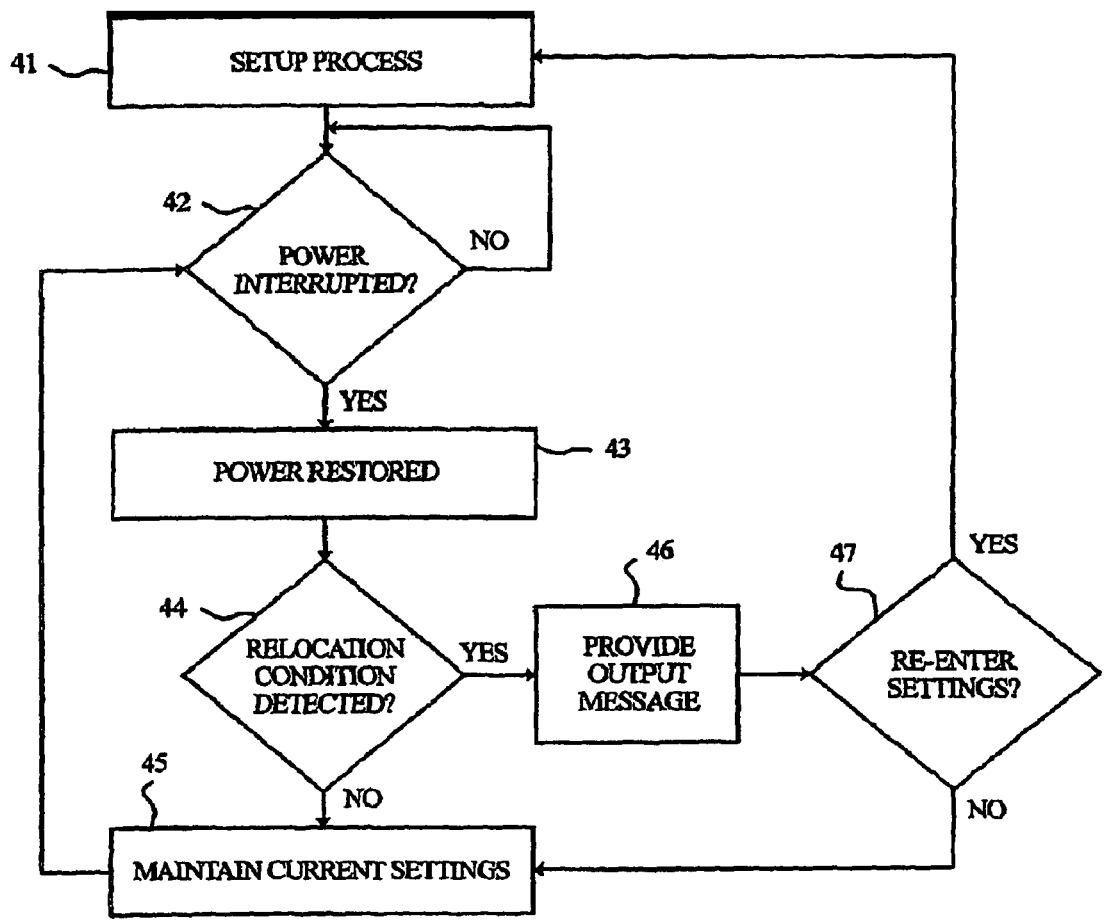
FIG. 4 is a flowchart illustrating exemplary steps according to another aspect of the present invention.

Turning now to FIG. 4, a flowchart 40 illustrating exemplary steps according to another aspect of the present invention is shown. For purposes of example and explanation, the steps of FIG. 4 will also be described with reference to television signal receiver 20 of FIG. 2. The steps of FIG. 4 are merely exemplary, and are not intended to limit the present invention in any manner.

At step 41, a setup process for the emergency alert function of television signal receiver 20 is performed. Step 41 of FIG. 4 is substantially identical to step 31 of FIG. 3. Accordingly, for details of step 41, the reader should refer to the description of step 31 previously provided herein.

At step 42, a power interruption to television signal receiver 20 may be detected. According to an exemplary embodiment, processor 27 may detect the power interruption, which may be attributable to various different factors. For example, the power interruption may be the result of a temporary condition, such as a thunderstorm or interference to the power distribution system. Alternatively, the power interruption may be the result of television signal receiver 20 being physically relocated to a new geographical area, such as during a household move.

At step 43, the power to television signal receiver 20 is restored. At step 44, a determination is made as to whether a condition indicating that television signal receiver 20 has been relocated is detected. According to an exemplary embodiment, processor 27 is programmed to make the determination at step 44, and the condition indicating that television signal receiver 20 has been relocated may include one or more factors, such as the duration of the power interruption and/or the signal strength on a previously identified frequency channel associated with the emergency alert function. Depending on implementation, television signal receiver 20 may have to be turned on by a user before step 44 is performed. The determination at step 44 may be performed in accordance with several different exemplary embodiments.

According to one exemplary embodiment of step 44, processor 27 or other element of television signal receiver 20 includes a clock (not shown in FIG. 2) which maintains time for a given time period after the power interruption at step 42 using power from energy storage components (e.g., capacitors, etc.). Processor 27, which also receives power from the energy storage elements, monitors the duration of the power interruption using the clock time, and sets a flag when the duration of the power interruption exceeds a predetermined time period, such as 24 hours or other time period. Accordingly, the aforementioned energy storage components should be designed to provide power to the clock and processor 27 for at least as long as the predetermined time period. The predetermined time period used in practice is a matter of design choice. After power to television signal receiver 20 is restored at step 43, processor 27 makes the determination at step 44 by checking the status of the flag. If the flag is set, the determination at step 44 is positive. Alternatively, if the flag is not set, the determination at step 44 is negative.

According to another exemplary embodiment of step 44, processor 27 or other element of television signal receiver 20 includes a clock (not shown in FIG. 2) which maintains time for a precise time period after the power interruption at step 42 using power from energy storage components (e.g., capacitors, etc.). The precise time period for which the clock is powered is a matter of design, and may for example be 24 hours or other time period. With this exemplary embodiment, the clock blanks out when it loses power after the precise time period passes. After power to television signal receiver 20 is restored at step 43, processor 27 makes the determination at step 44 by checking the status of the clock. If the clock is blanked, the determination at step 44 is positive. Alternatively, if the clock is not blanked, the determination at step 44 is negative.

According to still another exemplary embodiment of step 44, processor 27 or other element of television signal receiver 20 includes a clock (not shown in FIG. 2) whose time is automatically stored in memory 27 when power is interrupted at step 42. After power to television signal receiver 20 is restored at step 43, processor 27 obtains the current time from the VBI of an incoming television signal via decoder 26. Processor 27 determines the duration of the power interruption by comparing the current time obtained from the VBI to the time stored in memory 27 when power was interrupted. Processor 27 then compares the time duration of the power interruption to a predetermined time period, such as 24 hours or other time period, to thereby make the determination at step 44. If the time duration of the power interruption is greater than or equal to the predetermined time period, the determination at step 44 is positive. Alternatively, if the time duration of the power interruption is less than the predetermined time period, the determination at step 44 is negative.

According to yet another exemplary embodiment of step 44, processor 27 determines whether the signal strength on one or more previously identified frequency channels associated with the emergency alert function has changed after the power interruption to television signal receiver 20. As previously indicated herein, the user setup process of steps 31 and 41 includes selection of a monitoring frequency to tune to in order to receive emergency alert signals (i.e., item B), and such selection may be facilitated through a frequency scanning operation which scans various frequency channels to thereby identify the monitoring frequencies that provide the highest signal strength. The results of this frequency scanning operation may be stored in memory 27. Accordingly, with this exemplary embodiment, processor 27 may enable television signal receiver 20 to check the signal strength on each of the previously identified monitoring frequencies (e.g., in descending order) after the power interruption. In this manner, the determination at step 44 may be positive when a frequency channel that provided relatively high signal strength before the power interruption provides relatively low signal strength after the power interruption, and/or when a frequency channel that provided relatively low signal strength before the power interruption provides relatively high signal strength after the power interruption, and/or when the hierarchy of signal strength on one or more of the previously identified frequency channels has changed after the power interruption (e.g., the frequency channel that provided the highest signal strength before the power interruption has changed and/or the $2^{nd}$, $3^{rd}$, $4^{th}$, etc. frequency channels are not in the same order of signal strength).

The exemplary embodiments of step 44 described above may also be combined. For example, the determination at step 44 may consider both the duration of the power interruption to television signal receiver 20 and the signal strength on one or more previously identified frequency channels associated with the emergency alert function. This may be performed in at least two different ways. According to one technique, a logical OR operation may be used such that the determination at step 44 is positive when either the duration of the power interruption exceeds a predetermined time period (e.g., 24 hours), or when the signal strength on one or more previously identified frequency channels associated with the emergency alert function has changed in some manner as described herein. According to another technique, a logical AND operation may be used such that the determination at step 44 is positive when both the duration of the power interruption exceeds a predetermined time period (e.g., 24 hours), and when the signal strength on one or more previously identified frequency channels associated with the emergency alert function has changed in some manner as described herein. Other factors than those expressly described herein may also be considered when making the determination at step 44.

Figure 5:
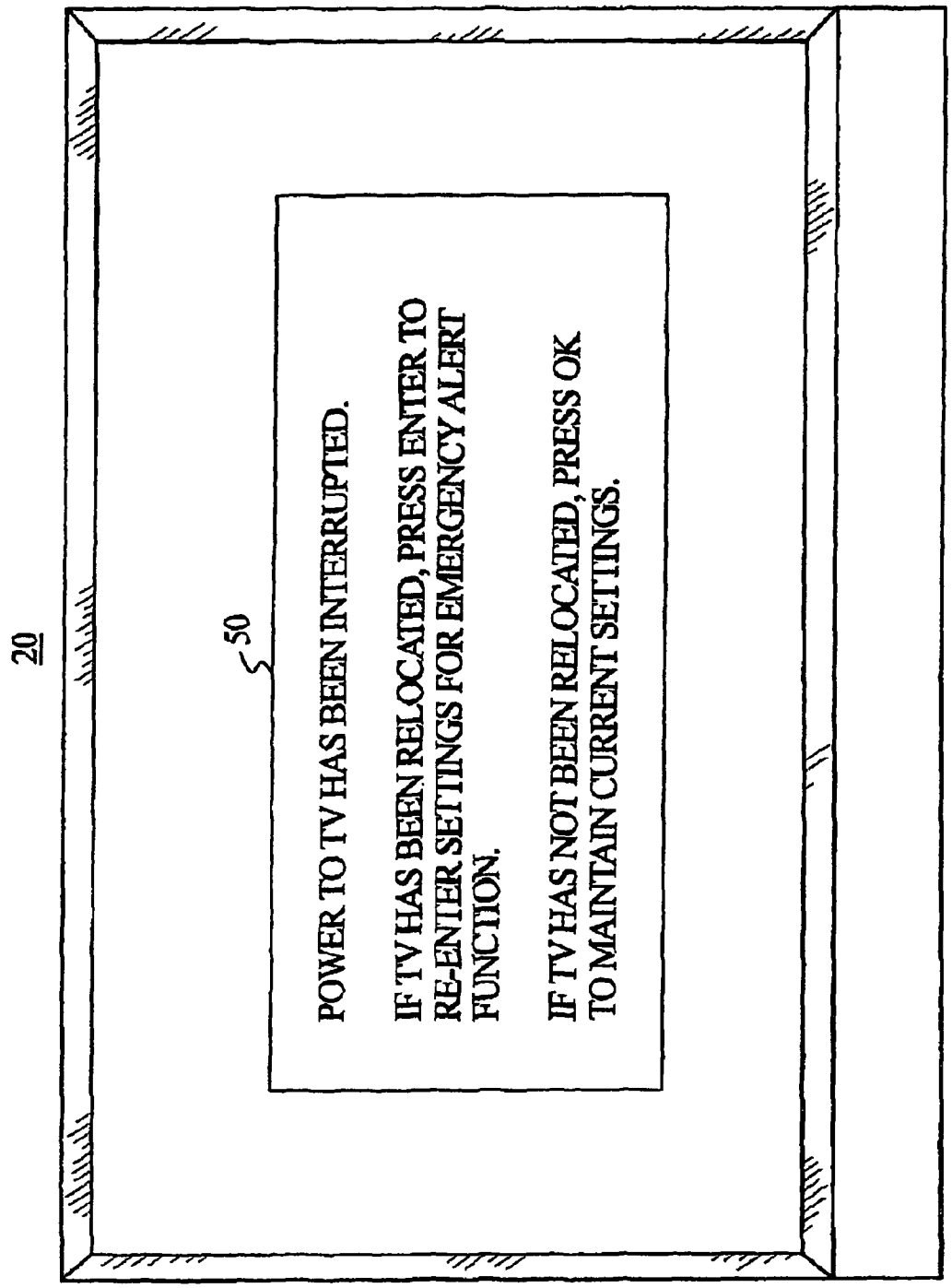
FIG. 5 is a diagram of a television signal receiver providing an exemplary output message according to the present invention.

If the determination at step 44 is negative, process flow advances to step 45 where the current settings for the emergency alert function are maintained. Alternatively, if the determination at step 44 is positive, process flow advances to step 46 where a predetermined output message is provided. FIG. 5 is a diagram of television signal receiver 20 providing an exemplary output message 50 which may be provided at step 46 according to the present invention. As indicated in FIG. 5, exemplary output message 50 indicates to a user, among other things, that power to television signal receiver 20 has been interrupted. Output message 50 is an example only, and other types of output messages may also be provided according to the present invention.

Next, at step 47 the user has an option to re-enter settings for the emergency alert function. According to an exemplary embodiment, the option to re-enter settings at step 47 may be presented to the user via the output message provided at step 46. For example, exemplary output message 50 of FIG. 5 presents a user with the option of whether to re-enter such settings, or to maintain the current settings. In this manner, a user may confirm whether television signal receiver 20 has actually been relocated.

If the user decides to re-enter settings for the emergency alert function, process flow loops back to step 41 where the user may perform the previously described setup process for the emergency alert function and thereby re-enter new settings based on the relocation of television signal receiver 20. Alternatively, if the user decides not to re-enter settings for the emergency alert function, process flow advances to step 45 where the current settings are maintained. From step 45, process flow loops back to step 42, as indicated in FIG. 4.

As described herein, the present invention provides an apparatus such as a television signal receiver having an emergency alert function capable of, among other things, detecting a condition indicating that the apparatus has been relocated after a power interruption, and enabling a user to provide updated information associated with the emergency alert function when the condition is detected. The present invention may be applicable to various apparatuses, either with or without a display device. Accordingly, the phrase "television signal receiver" as used herein may refer to systems or apparatuses capable of receiving and processing television signals including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling an apparatus having an emergency alert function, comprising:
   detecting a power interruption to said apparatus;
   determining an estimate of the duration of said detected power interruption;
   comparing said estimate of the duration of said detected power interruption to a predetermined threshold; and
   responsive to a determination that said estimate of the duration of said detected power interruption exceeded said predetermined threshold, enabling a user to provide updated information comprising location information associated with the emergency alert function responsive to detecting said power interruption.

2. The method of claim 1, wherein said updated information comprising location information includes a FIPS location code.

3. The method of claim 1, wherein said updated information includes a type of emergency event.

4. An apparatus having an emergency alert function, comprising:
   tuning means for tuning signals including emergency alert signals capable of activating said emergency alert function; and
   processing means for:
      detecting a power interruption to said apparatus;
      determining an estimate of the duration of said detected power interruption;
      comparing said estimate of the duration of said detected power interruption to a predetermined threshold; and
      responsive to a determination that said estimate of the duration of said detected power interruption exceeded said predetermined threshold, enabling a user to provide updated information comprising location information associated with the emergency alert function responsive to detecting said power interruption.

5. The apparatus of claim 4, wherein said updated information comprising location information includes a FIPS location code.

6. The apparatus of claim 4, wherein said updated information includes a type of emergency event.

7. A television signal receiver having an emergency alert function, comprising:
   a tuner operative to tune signals including emergency alert signals capable of activating said emergency alert function; and
   a processor operative to:
      detect a power interruption to said television signal receiver;
      determine an estimate of the duration of said detected power interruption;

compare said estimate of the duration of said detected power interruption to a predetermined threshold; and
enable a user to provide updated information comprising location information associated with the emergency alert function responsive to detecting said power interruption responsive to a determination that said estimate of the duration of said detected power interruption exceeded said predetermined threshold.

8. The television signal receiver of claim 7, wherein said updated information comprising location information includes a FIPS location code.

9. The television signal receiver of claim 7, wherein said updated information includes a type of emergency event.

* * * * *